United States Patent
Newton

[19]

[11] Patent Number: 5,978,757
[45] Date of Patent: Nov. 2, 1999

[54] POST STORAGE MESSAGE COMPACTION

[75] Inventor: Kenneth Alan Newton, Whitehall, Pa.

[73] Assignee: Lucent Technologies, Inc., Murray Hill, N.J.

[21] Appl. No.: 08/942,611

[22] Filed: Oct. 2, 1997

[51] Int. Cl.$^6$ ........................................ G10L 5/04
[52] U.S. Cl. .................. 704/217; 704/229; 704/500; 379/88; 379/89
[58] Field of Search .................... 704/201, 212, 704/219, 229, 500, 501, 217; 379/88, 89; 455/412, 413, 504

[56] References Cited

U.S. PATENT DOCUMENTS

| | | | |
|---|---|---|---|
| 4,550,426 | 10/1985 | Gillig et al. | 704/201 |
| 4,631,746 | 12/1986 | Bergeron et al. | 704/201 |
| 4,701,943 | 10/1987 | Davis et al. | 379/57 |
| 4,791,660 | 12/1988 | Oye et al. | 379/88 |
| 4,839,923 | 6/1989 | Kotzin | 704/201 |
| 4,903,301 | 2/1990 | Kondo et al. | 704/258 |
| 5,086,475 | 2/1992 | Kutaragi et al. | 704/201 |
| 5,353,374 | 10/1994 | Wilson et al. | 704/226 |
| 5,388,209 | 2/1995 | Akagiri | 704/229 |
| 5,438,643 | 8/1995 | Akagiri et al. | 704/201 |
| 5,506,872 | 4/1996 | Mohler | 375/240 |
| 5,546,395 | 8/1996 | Sharma et al. | 370/84 |
| 5,548,574 | 8/1996 | Shimoyoshi et al. | 369/124 |
| 5,664,060 | 9/1997 | Jarrett et al. | 704/270 |
| 5,675,333 | 10/1997 | Boursier et al. | 341/87 |
| 5,708,698 | 1/1998 | Akahane | 379/89 |
| 5,742,930 | 4/1998 | Howitt | 704/502 |

*Primary Examiner*—David R. Hudspeth
*Assistant Examiner*—Vijay B. Chawan

[57] ABSTRACT

In a voice messaging system, as voice memory fills, voice messages are retrieved from memory, re-compressed at a higher compression ratio and re-stored to memory as necessary to maintain a balance between stored voice quality and available memory for storage of new voice messages. The messages may be compressed using ADPCM, CELP, LPC or bit robbing. By re-compressing previously-stored voice messages on an as needed basis, a balance can be maintained between the need to maximize available memory while at the same time maintain the highest voice quality possible for the newest messages. While memory utilization is low, messages can be maintained in memory using a high voice quality, low compression ratio. However, as memory utilization is shrunk due to the storage of more messages, previously stored or other selected voice messages are re-compressed at a higher compression ratio while the newer messages continue to be compressed at the lowest compression ratio.

26 Claims, 6 Drawing Sheets

FIG. 11
PRIOR ART

POST STORAGE MESSAGE COMPACTION

BACKGROUND OF THE INVENTION

1. Field of the Invention

This invention relates generally to the storage of speech in memory. More particularly, it relates to the managed compression of speech messages already stored in memory to provide a balance between the quality of the stored speech and sufficient memory availability for new messages as required.

2. Background of Related Art

Voice messaging has become an everyday requirement in today's society. Early voice messaging apparatus comprised magnetic cassette tapes which recorded a significant amount of voice messages, e.g., 60 minutes of voice messages. However, cassette tapes were disadvantageous because of the mechanics and time required to fastforward and rewind the cassette tapes to the storage points of individual messages. Moreover, cassette tape voice message systems were not best suited in a business environment where multiple persons may utilize a common telephone switching system or voice messaging system.

More recently, particularly as the size of memory has increased in density while at the same time decreased in price, digital voice messaging systems have become commonplace. Voice compression techniques such as linear predictive coding (LPC) or code-excited linear predictive (CELP) coding utilized by some conventional digital voice messaging systems maximized the length of voice messages which could be stored in the finite amount of memory provided in such apparatus. Compression techniques have been developed for use with digital voice messaging systems which in general reduce the number of bits necessary to represent voice message data. In general, the greater the compression, the greater the degradation in the quality of the speech stored in the memory.

Figure 9:
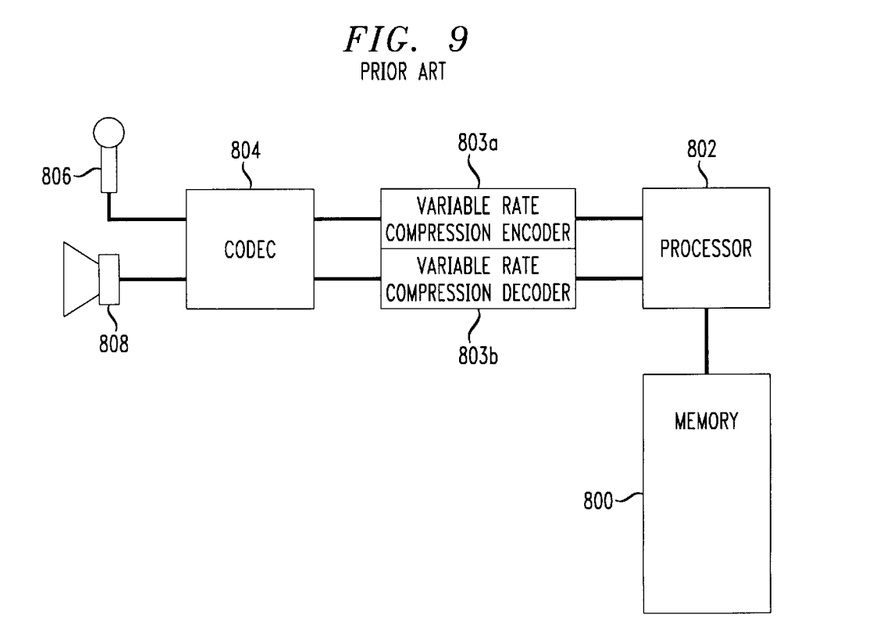
FIG. 9 shows a conventional speech messaging system.

Most recently, variable ratio voice compression techniques have been employed in voice messaging systems to maximize voice quality. Using variable ratio voice compression, the first message or so received by a voice messaging apparatus is typically stored in a memory at a lowest compression ratio, if compressed at all, and thus at the highest voice quality possible. "Compression ratio" as used herein refers to the ratio of the number of bits representing the voice message in linear form divided by the number of bits used to represent the same voice message in compressed or coded form. As new voice messages are stored, higher compression techniques are employed to compress new voice messages using higher compression ratios as the memory fills. This leads to a generally inverse relationship between the amount of memory utilized and the voice quality of the stored voice messages. The newest voice messages stored by these devices are stored using the highest compression ratios with respect to the oldest stored voice message. Moreover, the oldest stored voice messages utilize the most memory on a length-of-message basis with respect to the newest voice messages and are typically of the highest quality whether or not subsequent voice messages are stored. Thus, the stored voice quality of the newer voice messages suffers at the expense of the least compressed, not yet deleted, higher voice quality, older voice messages requiring more relative memory for storage FIG. 9 shows a prior art voice messaging apparatus. A signal from a microphone or other analog signal source 806 is input to a codec 804 for conversion to μ-law or A-law pulse code modulated (PCM) data. The μ-law or A-law PCM data is output to a variable compression ratio encoder 803a. The codec 804 also receives PCM data from a variable compression ratio decoder 803b and converts the same into an analog signal output to speaker 808 for playback. A processor 802 controls the encoder 803a and decoder 803b including the compression ratio of the variable compression ratio encoder 803a and decoder 803b. Processor 802 also controls storage of the compressed (encoded) speech data from the variable compression ratio encoder 803a into memory 800, and controls the retrieval of compressed speech data from memory 800 and output of the same to the variable compression ratio decoder 803b.

Figure 10:
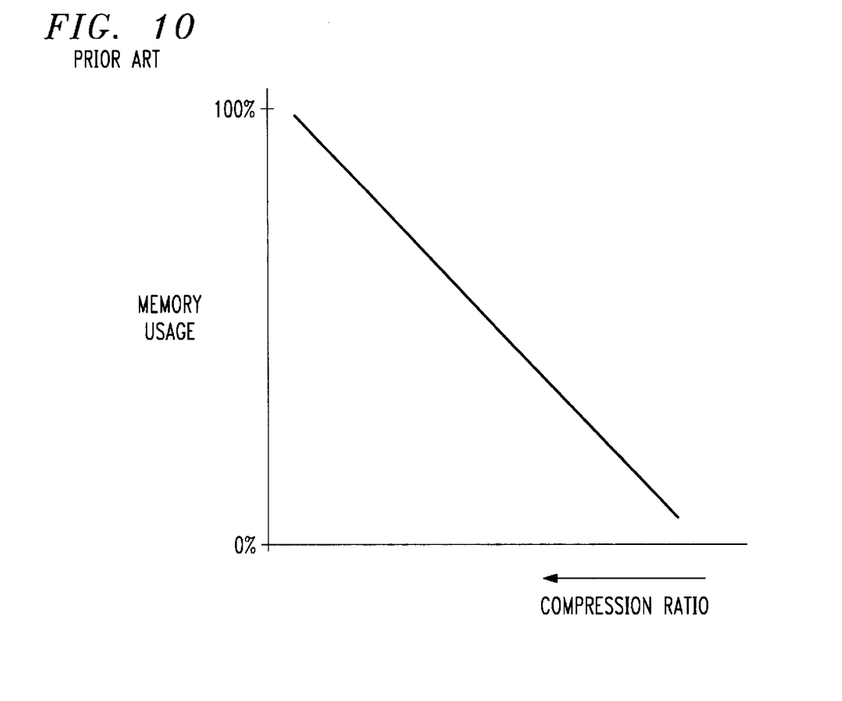
FIG. 10 graphically depicts the relative compression ratio and quality of voice messages stored in memory of the conventional speech messaging system shown in FIG. 9.
Figure 11:
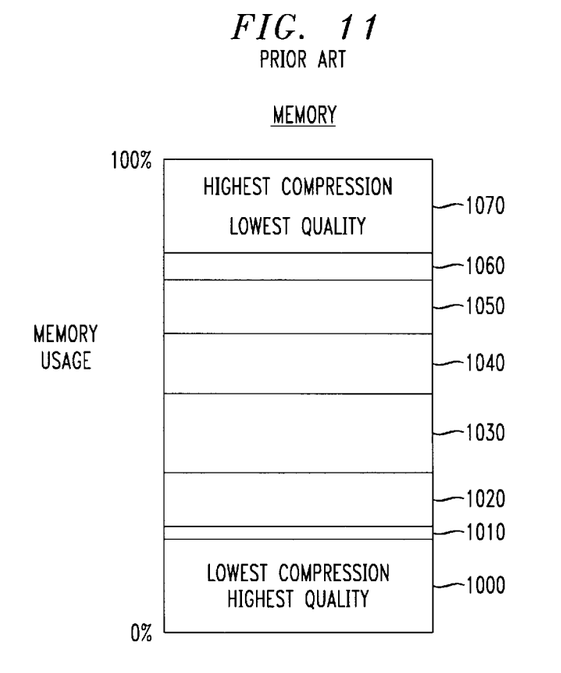
FIG. 11 depicts more generally the relative compression ratio and quality of voice messages stored in memory of the conventional speech messaging system shown in FIG. 9.

FIG. 10 depicts the generally linear relationship between the compression ratio of the variable compression ratio encoder 803a and the amount of physical memory utilized in memory 800. As stored voice messages build up in memory 800 as represented by percentage on the vertical axis in FIG. 10, the compression ratio of the variable compression ratio encoder 803a is increased, causing the quality of the stored speech (voice) messages to decrease. FIG. 11 similarly depicts the variation in stored speech quality as the memory usage increases.

While the use of variable compression ratio speech encoders and decoders increases the amount and length of voice messages which can be stored in memory, the capacity of the memory is maximized by the conventional voice messaging system at the expense of the quality of the stored speech. Thus, as the volume of stored messages increases, the quality of the most recently stored speech messages decreases.

SUMMARY OF THE INVENTION

In a voice messaging system, previously-stored voice messages are retrieved from memory, re-encoded at a higher compression ratio, and re-stored to the memory as the memory is filled. A balance is therefore maintained with voice messages as between stored voice quality and available memory for storage of new voice messages. In one embodiment, memory utilization beyond an encroachment point triggers the retrieval. At least a portion of the previously stored voice message is retrieved from the memory for re-storage at the more compressed, lower voice quality compression ratio. In this way the voice message utilizes less memory at the more compressed rate, making room for a new message at a lower compression ratio and higher voice quality. Thus, later-received voice messages are stored at a higher voice quality than the oldest voice messages in a fully utilized voice message memory.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

Figure 1:
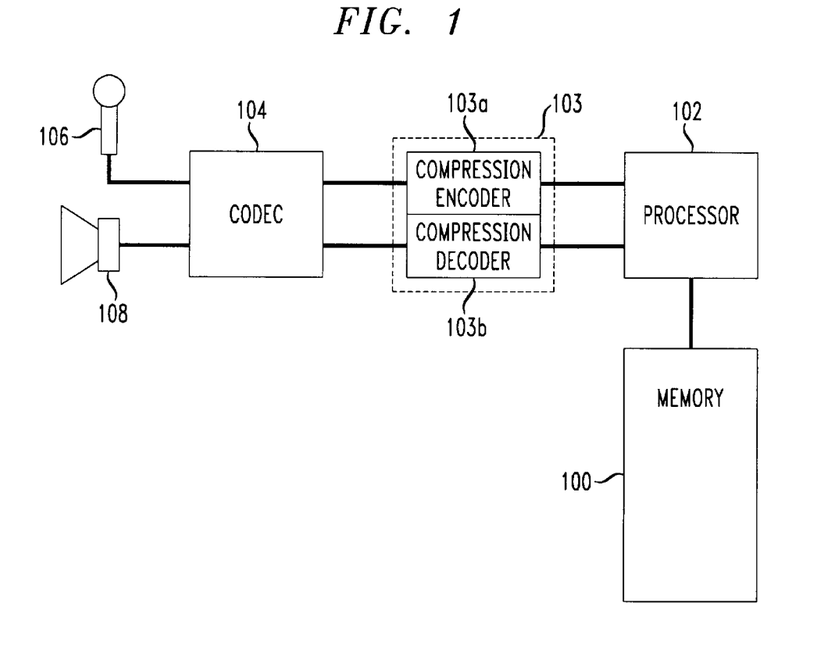
FIG. 1 shows a voice messaging system according to the present invention.

FIG. 1 shows a voice messaging system according to one embodiment of the present invention.

A signal from a microphone or other analog signal source 106 is input to a codec 104 for conversion into linear, $\mu$-law or A-law PCM data. Codec 104 also correspondingly converts linear, $\mu$-law or A-law PCM data into an analog signal for output to and playback on a speaker 108.

A voice compression encoder/decoder functional block 103 is formed by a voice compression encoder 103a and voice compression decoder 103b. The voice compression encoder/decoder functional block 103 may be implemented as a single component, e.g., in a digital signal processor (DSP), or as two separate devices: a voice compression encoder device and a voice compression decoder device. The particular voice compression utilized may be virtually any conventional compression technique, including but in no way limited to LPC, CELP, Adaptive Differential Pulse Code Modulation (ADPCM), bit robbing, and sample reduction, and no compression at all.

Moreover, the voice compression encoder 103a and decoder 103b may or may not have a variable compression ratio. The present invention does not require a variable compression ratio encoder 103a or decoder 103b, although a variable compression ratio encoder 103a and decoder 103b are preferred. Generally a single compression ratio encoder/decoder is less expensive than a variable ratio encoder/decoder, and can provide additional cost savings if desired. In the event that the voice compression encoder 103a and decoder 103b have a fixed compression ratio, processor 102 can be implemented to perform a conversion between the fixed compression ratio encoding/decoding of the voice compression encoder/decoder functional block 103 and a higher compression ratio of the voice messages stored in memory 100.

Figure 2:
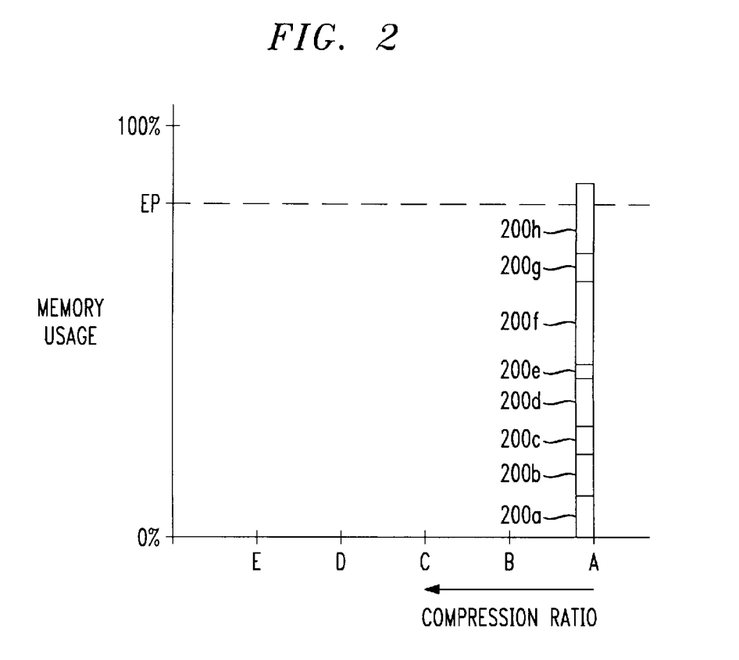
FIG. 2 depicts the relative compression ratio and quality of voice messages stored in memory when the memory is minimally utilized according to the present invention.

FIG. 2 depicts the storage of a series of separate voice messages 200a–200h in memory 100 by the voice messaging apparatus shown in FIG. 1.

As a first voice message 200a is received by the voice messaging apparatus, it is encoded using a lowest compression ratio provided by the voice compression encoder 103a, and stored in memory 100. In this way voice messages 200a–200h are stored at an optimum voice quality while there is available capacity in memory 100.

Memory 100 may be any suitable non-volatile or volatile memory such as RAM or FLASH memory.

Although FIG. 2 appears to depict the first voice message 200a as having been stored in a lowest part of memory, this is not necessarily the case. The MEMORY USAGE depicted in the vertical axis of FIG. 2 (and FIGS. 3–7) merely refers to a percentage of total memory used to store voice messages, and not to specific addresses within the memory 100.

Voice messages 200b–200g are stored when they are received by the voice messaging system at a lowest compression ratio A of the voice compression encoder 103a. Other compression ratios B through E referred to herein are progressively higher compression ratios than the compression ratio A, thus each progressively resulting in the storage of a lower quality compressed voice message.

All playback of voice messages 200a–200g at this point would be at a minimum compression ratio of the voice compression encoder 103a and decoder 103b, corresponding to the minimum compression ratio A and thus retain an optimum voice quality. Compression ratio A may include no compression at all.

One or more encroachment points EP in memory 100 are determined based on the compression and re-compression techniques utilized in accordance with the present invention, on the size of memory 100, and the typical length of voice messages. The encroachment point EP may be the point at which enough memory 100 remains to store a predetermined number of new messages at the lowest compression ratio A, e.g., one more message, five more messages, etc. Alternatively, the encroachment point EP can be the point at which a predetermined percentage of memory 100 remains available for the storage of new voice messages, e.g., 20% of memory 100 remaining for storage of new voice messages.

In FIG. 2, voice message 200h, when stored, crosses over the encroachment point EP thus triggering an off-line compression routine to be performed by the processor 102. The compression routine comprises a re-compression of stored voice messages at a higher compression ratio. The voice messaging system continues to encode and store the voice message 200h which crosses the encroachment point EP at the lowest compression ratio A of the voice compression encoder 103a as it is received, until storage is completed. However, after voice message 200h is stored and completed, the processor 102 initiates the compression routine in a subsequent off-line or quiet time period. Off-line herein refers to the time when the voice messaging apparatus is not recording or playing back any voice message.

Figure 3:
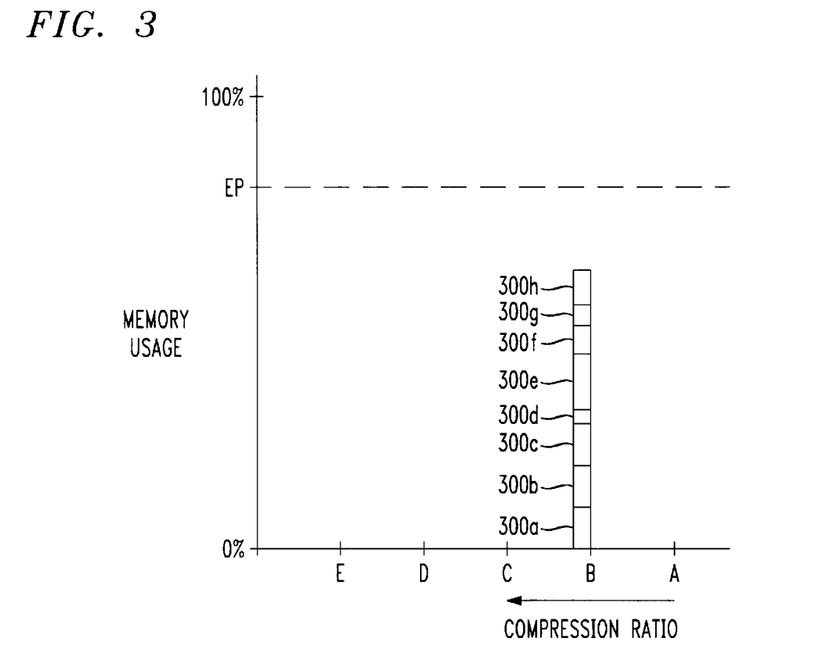
FIG. 3 depicts the relative compression ratio and quality of voice messages stored in memory after a first re-compression of previously-stored voice messages at a higher compression ratio according to the present invention.

The result of the compression routine is depicted in FIG. 3. One at a time, sequentially in chronological order from oldest message to newest message, or from a longest voice message to a shortest voice message, or other logical sequence, the compression routine of the voice messaging apparatus re-compresses one or more of the previously-stored voice messages 200a–200h in memory 100 at an incrementally lower voice quality using a higher compression ratio B. For example, a last received voice message need not be re-compressed. In another embodiment, the re-compression process includes decoding the voice message back into a linearly represented signal, then re-compressing the voice message at the higher compression, lower voice quality compression ratio B. Voice messages 200a–200h (FIG. 2) are re-compressed by the compression routine at compression ratio B and resaved in memory 100 as voice messages 300a–300h, respectively, as shown in FIG. 3.

In the disclosed embodiment, five incremental compression ratios A–E are depicted although clearly more individual compression ratios, fewer individual compression ratios, or a linear variation in compression ratios is possible.

Voice messages 200a–200h are deleted or otherwise erased from memory 100 one-by-one as the replacement, re-compressed voice messages 300a–300h are stored in memory 100.

At compression ratio B, voice messages 300a–300h require significantly less memory for storage than they did when stored at compression ratio A. Preferably, the re-compression process is performed off-line when no voice messages are being received, played or otherwise manipulated by the voice messaging apparatus, but this is dependent on the capacity of the processor 102. If the capacity of processor 102 allows, the re-compression process may be performed while other messages are being received.

The re-compression process of the off-line compression routine frees up a significant amount of memory to be used for the storage of new messages, but preferably purposely does not necessarily provide a maximum amount of available memory. A balance is preferably managed and maintained by the present invention between a quality level of the stored voice messages, and a compactness providing a sufficient amount of unused memory for new voice messages. As the memory 100 becomes nearly full by the storage of new voice messages, some or all of the previously-stored voice messages may be re-compressed either individually or as a group to free up an incremental amount of memory 100.

In the disclosed embodiment, if a new voice message is received by the voice messaging apparatus during processing of the compression routine by the processor 102, the processor 102 may complete the storage of the current voice message and then pause or otherwise exit the compression routine until the new voice message is completed and stored in memory 100. However, this is dependent upon the capacity of the processor 102.

All messages are decoded for playback at the relevant compression ratio at which the voice message is stored in memory 100. The newest messages may even enjoy no compression at all to provide the highest possible quality of the latest stored voice messages. The processor 102 may assist the encoding and decoding function of the encoder/decoder 103 in implementing the compression and decompression. For instance, the processor 102 may provide a compression ratio adaption function if necessary as between the compression ratio of the voice compression decoder 103b and the compression ratio at which the relevant voice message was stored in the memory 100.

Figure 4A:
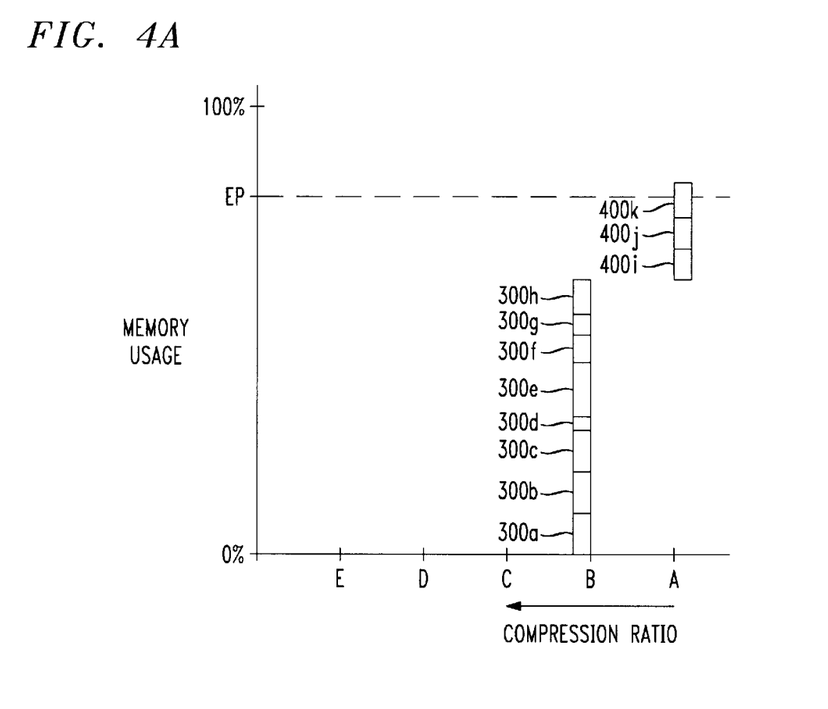
FIG. 4A depicts subsequent storage of new voice messages in memory after the first re-compression depicted in FIG. 3.

FIG. 4A depicts the storage of three new voice messages 400i–400k after the re-compression of the existing voice messages 300a–300h shown in FIG. 3. Note that while the previously existing voice messages were re-compressed at compression ratio B, the new voice messages are nevertheless encoded at the lowest compression ratio A.

Figure 4B:
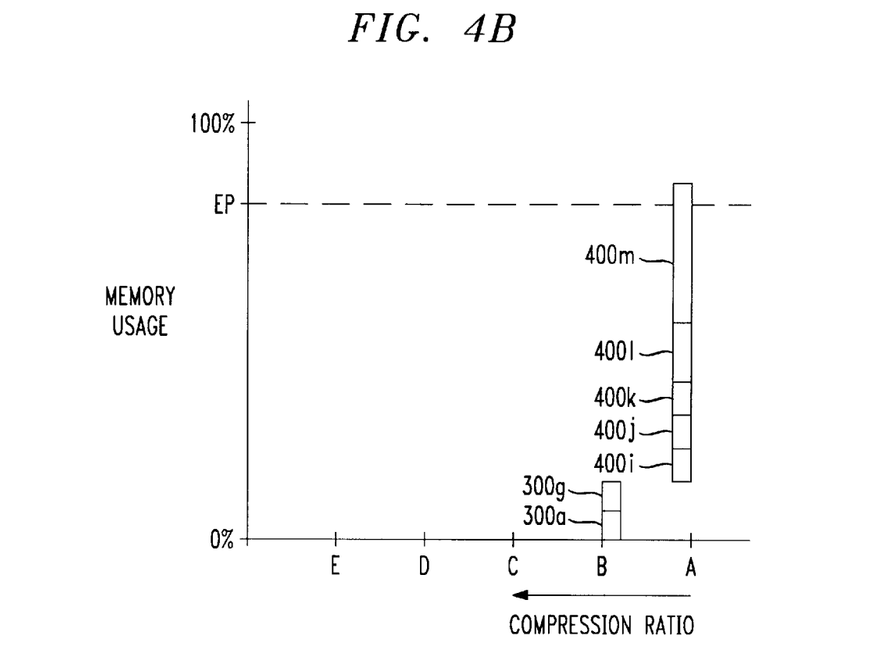
FIG. 4B depicts the deletion of older voice messages which have been re-compression according to the present invention.

FIG. 4B shows the result of the deletion or erasure of certain voice messages, e.g., voice messages 300b–300f and 300h. The deletion of voice messages from memory 100 results in more capacity provided for new message storage at the lowest compression ratio A, as shown by the storage of new messages 400l and 400m. Moreover, the storage of new message 400m in the example shown in FIG. 4B results in the initiation of the compression routine to re-compress all messages, the result of which is shown in FIG. 5.

Once a voice message is re-compressed at a higher compression ratio, some of the voice quality may be irretrievably lost. Therefore, re-compression performs a compression only to a higher compression ratio. Decompression of a voice message back to a lower compression ratio from a higher compression ratio will not generally improve the voice quality of the stored speech.

Figure 5:
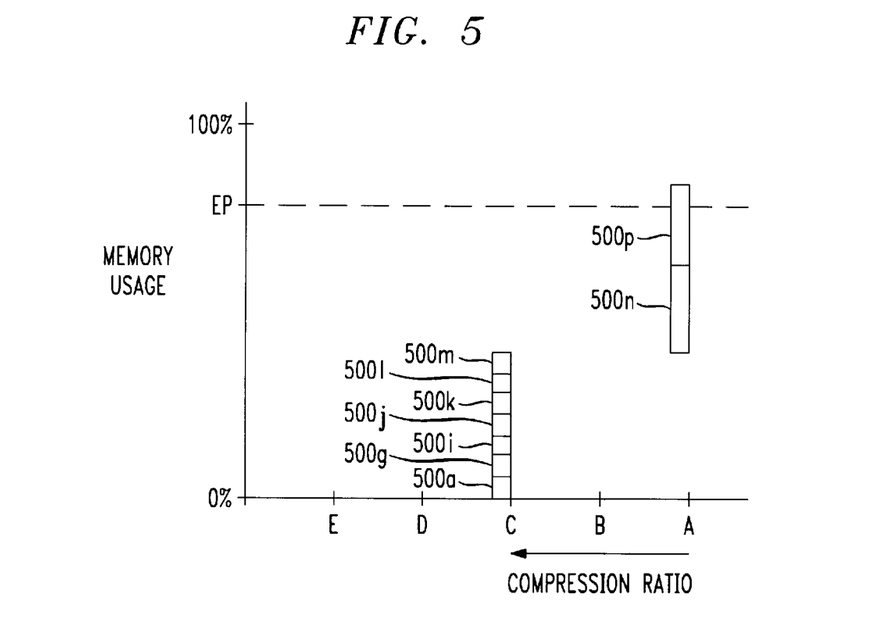
FIG. 5 depicts the relative compression ratio and quality of voice messages stored in memory after a second re-compression of previously-stored voice messages at a higher compression ratio, and subsequent storage of new speech in memory after the second re-compression, according to the present invention.

In FIG. 5, all voice messages stored using compression ratio A and B are re-compressed at an even higher compression ratio C.

Figure 6:
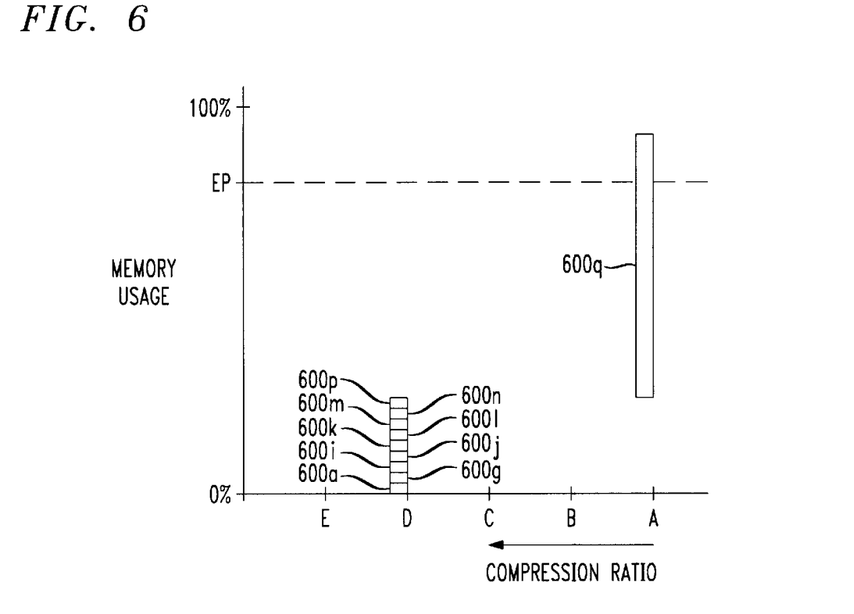
FIG. 6 depicts the relative compression ratio and quality of previously-stored voice messages stored in memory after a third re-compression at a higher compression ratio, and subsequent storage of new speech in memory after the third re-compression, according to the present invention.

FIGS. 6 shows the compression of the voice messages shown in FIG. 5 after the storage of voice message 500p surpasses encroachment point EP (FIG. 5). The storage of new voice message 600q causes the initiation of the compression routine in the processor 102 to re-compress the already-stored voice messages at the highest compression ratio of the disclosed embodiment, i.e., compression ratio E. New voice messages 700r–700v are subsequently stored in memory 100, with the storage of new voice message 700v causing the initiation of the re-compression of only voice messages 700r–700u. All previously stored and undeleted voice messages 600 are already stored at the highest compression ratio E, and thus are no longer compressed by the compression routine.

Figure 7:
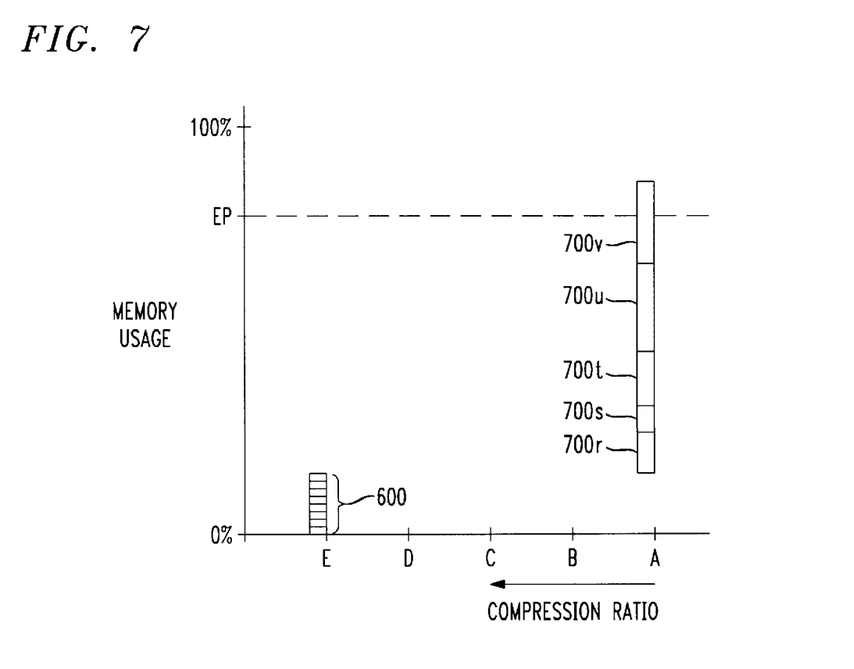
FIG. 7 depicts the relative compression ratio and quality of voice messages stored in memory after a fourth re-compression of previously-stored voice messages at a higher compression ratio, and subsequent storage of new speech in memory after the fourth re-compression, according to the present invention.

FIG. 7 depicts the relative compression ratio and quality of voice messages 600 stored in memory 100 after a fourth re-compression of the previously-stored and undeleted voice messages shown in FIG. 6, at the highest compression ratio E. After the fourth re-compression, a significant amount of memory 100 is made available for subsequent storage of new voice messages 700r–700v.

Figure 8:
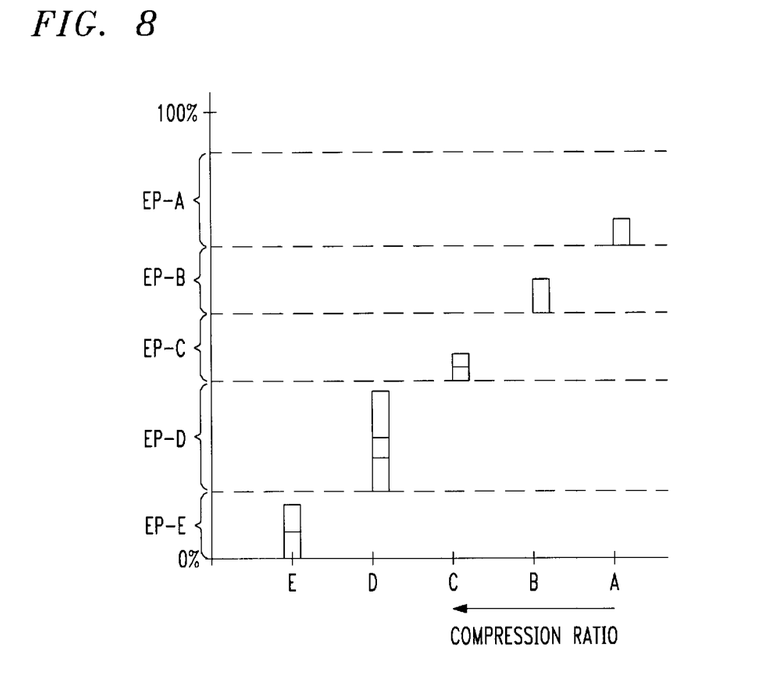
FIG. 8 shows an alternative embodiment of the present invention showing a plurality of threshold or encroachment points.

An encroachment point may be established for each of a plurality of subsets of stored voice messages. For instance, FIG. 8 depicts an embodiment of the present invention utilizing a separate encroachment point EP-A to EP-E for voice messages compressed at each of the compression ratios A to E. When the voice messages stored at any compression ratio utilize an amount of memory exceeding that indicated by the encroachment point EP-A to EP-E, then a re-compression routine is initiated to re-compress the voice messages in that particular subset at the next highest compression ratio.

Accordingly, in the disclosed embodiment, the maximum capacity of memory 100 corresponds to the voice messages which can be stored in memory 100 at the highest compression ratio E. However, until which time that the full capacity of the memory is utilized, new voice messages, particularly those stored at the lowest compression ratio A, do not suffer a degradation in voice quality when stored. At worst, only the voice quality of the oldest messages degrades as the capacity of memory 100 is reached.

While the invention is described with respect to a higher compression ratio relating to a lower voice quality, this is not necessarily the case. As compression technology progresses there may be other reasons to compress voice message data. For instance, higher compression ratios may be possible, but at the expense of extensive processor time which may better be handled during off periods for the voice messaging system.

While the invention has been described with reference to the exemplary preferred embodiments thereof, those skilled in the art will be able to make various modifications to the described embodiments of the invention without departing from the true spirit and scope of the invention.

I claim:

1. A method of post storage message compaction, comprising:

retrieving at least a portion of a voice message from memory, said voice message being encoded at a first compression ratio;

re-compressing said voice message at a second compression ratio different from said first compression ratio; and re-storing said voice message encoded at said second compression ratio in said memory.

2. The method of post storage message compaction according to claim 1, wherein:

said re-compression of said voice message results in said voice message requiring fewer bits of memory after re-compression than before said step of re-compressing.

3. The method of post storage message compaction according to claim 1, wherein:

said voice message encoded at said second compression ration has a lower voice quality than said voice message encoded at said first compression ratio.

4. The method of post storage message compaction according to claim 1, further comprising:

secondly retrieving said voice message from said memory; and secondly re-storing said voice message in said memory at a third compression ratio different from said first and second compression ratios.

5. The method of post storage message compaction according to claim 4, wherein:

said secondly re-storing is performed when storage of a newest voice message results in a substantial encroachment upon a predetermined level of utilization of said memory, utilization of said memory being lessened by said secondly re-storing.

6. The method of post storage message compaction according to claim 5, wherein:

said predetermined level of utilization of said memory is a percentage of a capacity of said memory.

7. The method of post storage message compaction according to claim 1, wherein:

said re-storing is performed during an off-line period of time.

8. The method of post storage message compaction according to claim 1, wherein said compression and said re-compression are at least one of:

bit robbing; and sample reduction.

9. The method of post storage message compaction according to claim 1, wherein:

said first compression ratio utilizes ADPCM.

10. The method of post storage message compaction according to claim 1, wherein:

said first compression ratio utilizes linear predictive coding.

11. The method of post storage message compaction according to claim 1, wherein:

said first compression ratio utilizes CELP.

12. A method of post storage message compaction comprising:

receiving a first voice message;

storing said first voice message in a memory at a first voice quality compression ratio;

retrieving said first voice message from said memory; and secondly storing said first voice message in said memory at a second voice quality compression ratio different from said first voice quality compression ratio.

13. The method of post storage message compaction according to claim 12, wherein:

said voice message encoded at said second voice quality compression ratio has a lower voice quality than said voice message encoded at said first voice quality compression ratio.

14. The method of post storage message compaction according to claim 12, further comprising:

secondly retrieving said first voice message from said memory; and thirdly storing said first voice message in said memory at a third voice quality compression ratio different from said first voice quality compression ratio and said second voice quality compression ratio.

15. The method of post storage message compaction according to claim 14, wherein:

said secondly storing is performed when storage of a newest voice message results in a substantial encroachment upon a predetermined level of utilization of said memory, utilization of said memory being lessened by said secondly storing; and said thirdly storing is performed after said secondly storing.

16. The method of post storage message compaction according to claim 12, wherein:

said secondly storing is performed when storage of a newest voice message results in a substantial encroachment upon a predetermined level of utilization of said memory, utilization of said memory being lessened by said secondly storing.

17. The method of post storage message compaction according to claim 15, wherein:

said predetermined level of utilization of said memory is a percentage of a capacity of said memory.

18. The method of post storage message compaction according to claim 12, wherein:

said secondly storing is performed during an off-line period of time.

19. The method of post storage message compaction according to claim 12, wherein said first voice quality compression ratio and said second voice quality compression ratio utilize at least one of:

bit robbing; and sample reduction.

20. The method of post storage message compaction according to claim 12, wherein:

said first voice quality compression ratio and said second voice quality compression ratio utilize ADPCM.

21. The method of post storage message compaction according to claim 12, wherein:

said first voice quality compression ratio and said second voice quality compression ratio utilize CELP.

22. The method of post storage message compaction according to claim 12, wherein:

said first voice quality compression ratio and said second voice quality compression ratio linear predictive coding.

23. A voice message system comprising:

a voice encoder and decoder to respectively compress and decompress voice message data;

a processor; and memory in communication with said processor, said memory including an encroachment point indicating a threshold of utilization of said memory;

wherein said processor is adapted and arranged to store in said memory a previously received and stored voice message at a higher compression ratio than a compression ratio at which a most recently received voice message is stored.

24. The voice message system according to claim 23, wherein:

said previously received and stored voice message is a longest stored voice message.

25. The voice message system according to claim 23, wherein:

said previously received and stored voice message has a lowest compression ratio.

26. The voice message system according to claim 23, wherein:

said previously received and stored voice message utilizes a most amount of voice memory.

* * * * *